(12) United States Patent
Miller et al.

(10) Patent No.: US 11,152,844 B2
(45) Date of Patent: Oct. 19, 2021

(54) ELECTRIC MACHINE

(71) Applicant: ROLLS-ROYCE plc, London (GB)

(72) Inventors: Paul R Miller, Derby (GB); Stephen M Husband, Derby (GB); Alexander C Smith, Holmfirth (GB); Charalampos Manolopoulos, Manchester (GB); Matteo Iacchetti, Manchester (GB)

(73) Assignee: ROLLS-ROYCE plc, London (GB)

( * ) Notice: Subject to any disclaimer, the term of this patent is extended or adjusted under 35 U.S.C. 154(b) by 209 days.

(21) Appl. No.: 16/548,032

(22) Filed: Aug. 22, 2019

(65) Prior Publication Data

US 2020/0091810 A1    Mar. 19, 2020

(30) Foreign Application Priority Data

Sep. 18, 2018    (GR) ................................ 20180100429

(51) Int. Cl.
| | |
|---|---|
| *H02K 55/04* | (2006.01) |
| *H02K 3/02* | (2006.01) |
| *H02K 3/14* | (2006.01) |
| *H02K 3/42* | (2006.01) |
| *H02K 7/18* | (2006.01) |

(Continued)

(52) U.S. Cl.
CPC .......... *H02K 55/04* (2013.01); *B64D 27/02* (2013.01); *B64D 27/24* (2013.01); *H02K 3/02* (2013.01); *H02K 3/14* (2013.01); *H02K 3/42* (2013.01); *H02K 7/1815* (2013.01); *H02K 7/1823* (2013.01); *B64D 2027/026* (2013.01); *B64D 2221/00* (2013.01)

(58) Field of Classification Search
CPC ............ H02K 55/04; H02K 3/02; H02K 3/14; H02K 3/42; H02K 7/1823; H02K 7/1815; B64D 27/24; B64D 27/02; B64D 2027/026; B64D 2221/00
USPC ........................................... 244/53 R; 290/52
See application file for complete search history.

(56) References Cited

U.S. PATENT DOCUMENTS

| | | | |
|---|---|---|---|
| 6,489,701 B1 | 12/2002 | Gamble et al. | |
| 8,378,537 B2 * | 2/2013 | Husband ................ | H02K 55/02 310/64 |

(Continued)

FOREIGN PATENT DOCUMENTS

| | | |
|---|---|---|
| EP | 0508936 A1 | 10/1992 |
| EP | 1282220 A2 | 2/2003 |

(Continued)

OTHER PUBLICATIONS

Nov. 5, 2020 Office Action issued in European Patent Application No. 19192292.1.

(Continued)

*Primary Examiner* — Charles Reid, Jr.
(74) *Attorney, Agent, or Firm* — Oliff PLC (57) ABSTRACT

An electric machine including a stator having a fully non-magnetic core and stator windings formed of a non-superconducting transposed conductor to reduce eddy current losses. It further includes a rotor having a fully non-magnetic core and superconducting windings or superconducting magnets which produce a magnetic field for interaction with the stator windings. A cryogenic cooling system is arranged to cool the stator windings to reduce conduction losses in the stator windings.

15 Claims, 6 Drawing Sheets

(51) Int. Cl.
*B64D 27/24* (2006.01)
*B64D 27/02* (2006.01)

(56) References Cited

U.S. PATENT DOCUMENTS

| | | | |
|---|---|---|---|
| 2003/0052568 A1 | 3/2003 | Howard | |
| 2008/0001495 A1 | 1/2008 | Qu et al. | |
| 2012/0115732 A1 | 5/2012 | Husband et al. | |
| 2016/0214727 A1* | 7/2016 | Hamel | B64D 27/20 |
| 2017/0292523 A1* | 10/2017 | Niergarth | B64D 27/24 |
| 2018/0304753 A1* | 10/2018 | Vondrell | B64D 27/02 |
| 2019/0009917 A1 | 1/2019 | Anton et al. | |
| 2020/0079513 A1* | 3/2020 | Pastouchenko | B64D 27/02 |

FOREIGN PATENT DOCUMENTS

| | | |
|---|---|---|
| WO | 01/41283 A2 | 6/2001 |
| WO | 2009/068844 A1 | 6/2009 |

OTHER PUBLICATIONS

Kiruba S Haran et al.: "High power density superconducting rotating machines-development status and technology roadmap", Superconductor Science and Technology, IOP Publishing, Techno House, Bristol, GB, vol. 30, No. 12, Nov. 17, 2017, p. 123002.

Minseok Joo et al.: "Comparison of characteristics of large-scale high-Tc superconducting synchronous motor and conventional iron-core motor", IEEE Transactions On Applied Superconductivity, IEEE Service Center, Los Alamitos, CA, US, vol. 9, No. 2, Jun. 1, 1999, pp. 1257-1260.

Nov. 11, 2019 European Search Report issued in European Patent Application No. 19192292.1.

Apr. 23, 2019 Search Report issued in British Patent Application No. GB1817883.0.

* cited by examiner

ELECTRIC MACHINE

TECHNICAL FIELD

This disclosure relates to electric machines.

BACKGROUND

Whilst the use of electric machines for aerospace propulsion is known, conventional electric machines generally have insufficient specific torque and power densities (whether measured in terms of weight or volume) for use in large airliners.

A large fraction of the weight of conventional electric machines may be found in its magnetic core (often referred to as the "iron"). The magnetic core is formed from ferromagnetic material and thus typically constitutes from around 50 percent to in some instances 70 percent of the active weight of the machine.

There are no known practical magnetic materials which are not ferromagnetic, and thus the only approach available to reduce the weight of the stator magnetic core is to remove it entirely (often referred to as an "air-cored" configuration). However, this has a drastic impact upon the magnetic field strength in the stator due to the increase in reluctance, and in turn therefore the torque developed. Indeed, the impact is such that the power to weight ratio may be worse than if the magnetic core was retained.

SUMMARY

The invention is directed towards electric machines. In one aspect, such a machine comprises a stator having a fully non-magnetic core and stator windings formed of a non-superconducting transposed conductor to reduce eddy current losses.

The machine further comprises a rotor having a fully non-magnetic core and superconducting windings or superconducting magnets which produce a magnetic field for interaction with the stator windings A cryogenic cooling system is arranged to cool the stator windings to reduce conduction losses in the stator windings.

As set out previously, removal of the magnetic core in conventional machines results in a large reduction in field strength. The use however of superconducting windings or superconducting magnets enables the production of extremely high fields, which, despite the fully non-magnetic core, enables the production of high torque and thus a high power-to-weight ratio.

It will be appreciated however that removal of the stator magnetic core will expose the stator windings to this high field. This would be the case either with conventional, non-superconducting stator windings, or superconducting stator windings. This is because superconducting stator windings only exhibit ideally zero loss when exposed to time-invariant fields—in an electric machine the stator windings are clearly exposed to time-varying fields from the rotor. These time-varying fields create eddy current losses which may cause a superconducting stator winding to quench and thus require shut-down of the machine.

Thus, in the present invention the approach taken is to use a non-superconducting transposed conductor. In an embodiment, the transposed conductor may be a litz conductor. In this way, eddy current losses are minimised. Clearly, however, conduction losses still exist in a conventional non-superconducting conductor and so a cooling system is provided to cool the stator windings. The inventors have found a surprising increase in performance of the machine by using a cryogenic cooling system to maximise the reduction in conduction losses.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
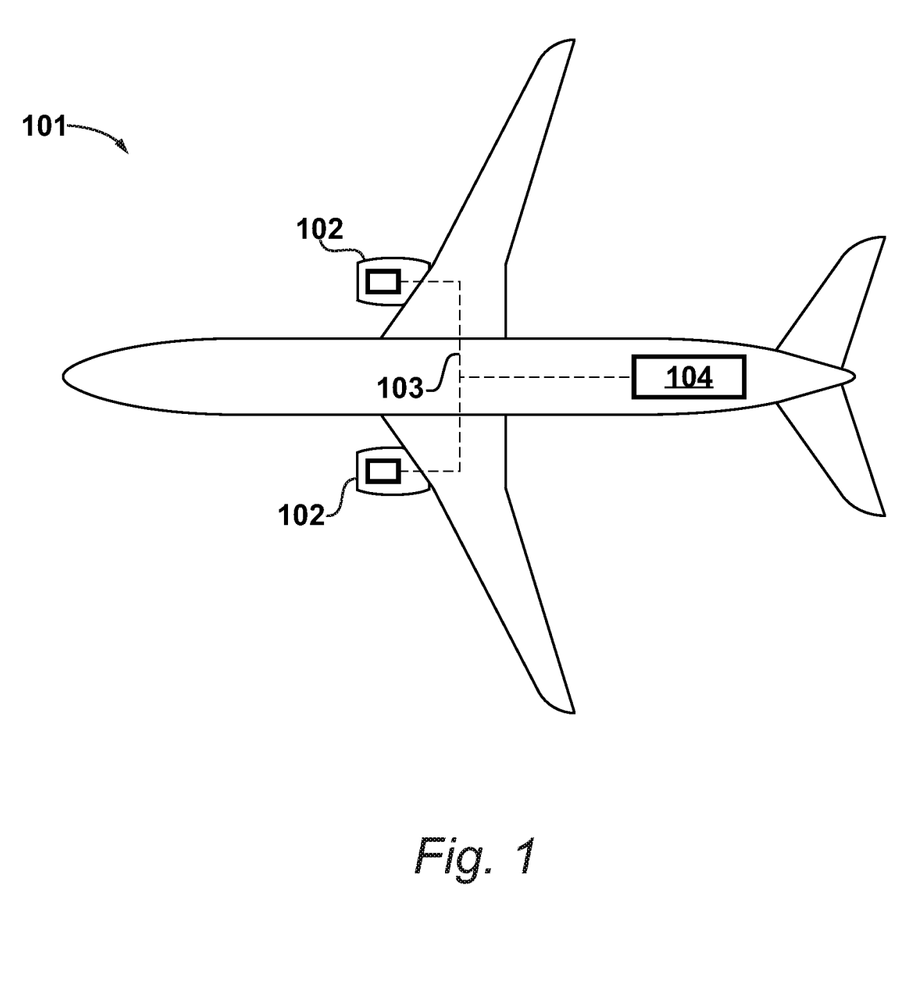
FIG. 1 shows an aircraft of an embodiment.

An aircraft 101 is illustrated in FIG. 1, and in this example comprises two electric propulsion units 102.

The electric propulsion units 102 are connected via a power distribution bus 103 to a source of electrical power, which in the present example is an internal combustion engine configured to drive an electric machine. In the specific embodiment of FIG. 1, the source of electrical power is turboelectric generator 104, in which the internal combustion engine is a gas turbine engine. In an alternative embodiment, the internal combustion engine may be a piston engine or similar. The source of electrical power could alternatively by a fuel cell, battery, etc.

Each electric propulsion unit 102 includes an electric machine configured to drive a propulsive fan. In the present example, the electric propulsion units 102 are ducted fans, although it will be appreciated that in alternative embodiments the electric propulsion units 102 may be configured as open propellers (a type of propulsive fan), or any other configuration able to produce thrust by causing a pressure rise in the incident airflow.

Figure 2:
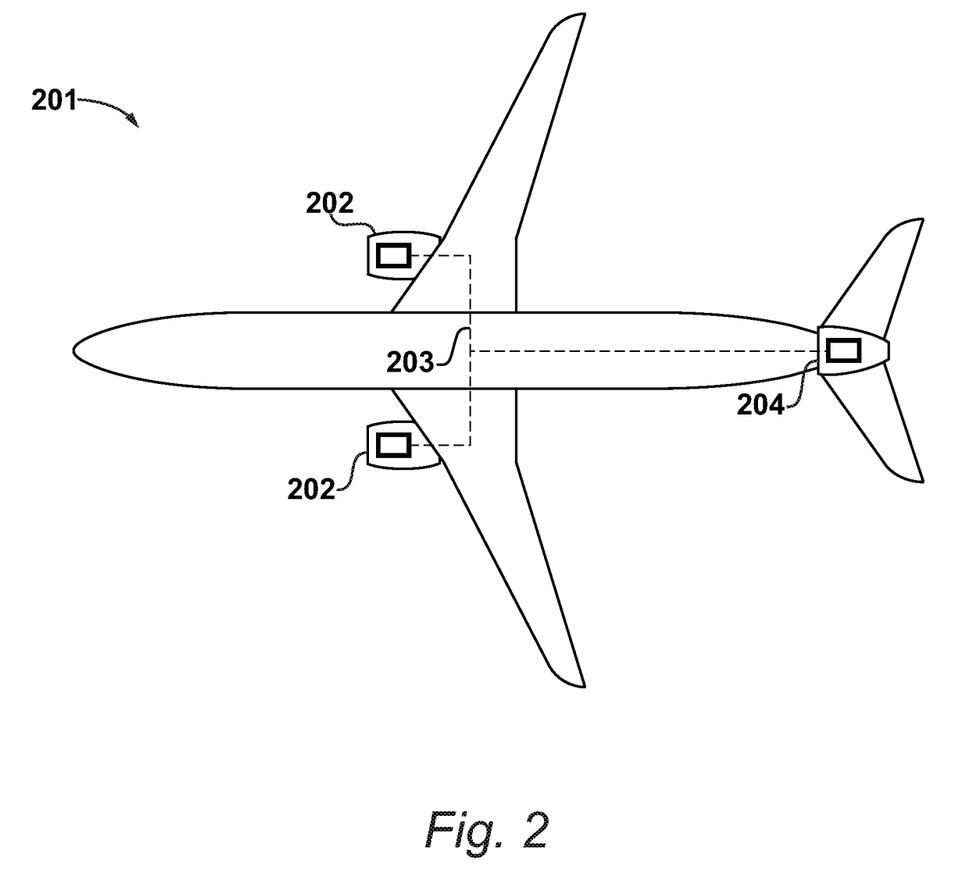
FIG. 2 shows an aircraft of another embodiment.

An alternative aircraft 201 is illustrated in FIG. 2, and in this example comprises two turbofan engines 202 which include respective electric machines. The electric machines act as a source of electrical power, which is provided, via a power distribution bus 203, to a boundary layer ingestion system 204. The boundary layer ingestion system 204 comprises an electric machine configured to drive the fan, which improves the propulsive efficiency of the aircraft 201.

Figure 3:
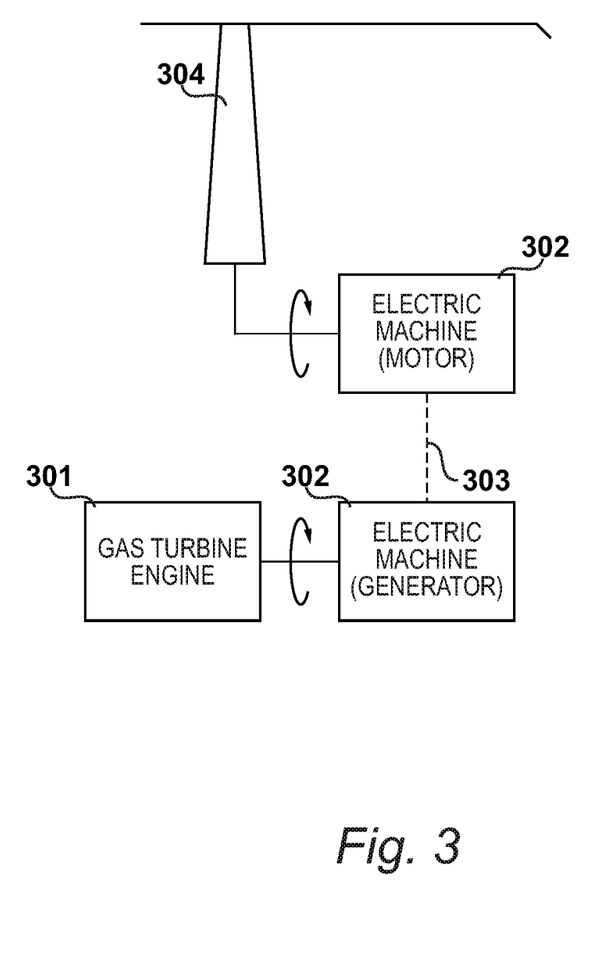
FIG. 3 is a block diagram of the propulsion systems in the aircraft of FIG. 1 and the aircraft of FIG. 2.

Common features of the propulsion systems employed by both aircraft 101 and aircraft 201 are illustrated in block diagram form in FIG. 3. In the present example, therefore, a gas turbine engine 301 drives an electric machine 302 operating as a generator via an interconnecting shaft, thus providing a source of electrical power. This power is distributed on the bus 303. Power is drawn from the bus 303 by another electric machine 302, which in this instance operates as a motor. This in turn drives a propulsive fan 304 via an interconnecting shaft, thereby providing propulsion. It will be appreciated that in this embodiment, the generator and motor are provided by the same configuration of electric machine 302. However, in alternative embodiments, the motor and generator may be of different configurations. It will be appreciated that depending upon the configuration of the aircraft (for example aircraft 101) further propulsive fans and electric machines to drive them may be provided.

It will also be appreciated that additional sources of power, in the form of additional turboelectric generators, or fuel cells, batteries, etc. or any combination thereof, may be provided (for example as with aircraft 201).

In the present embodiment, the electric machine 302 is of the type claimed herein. It is shown in cross-section along its meridional plane in FIG. 4, along with supporting hardware.

Figure 4:
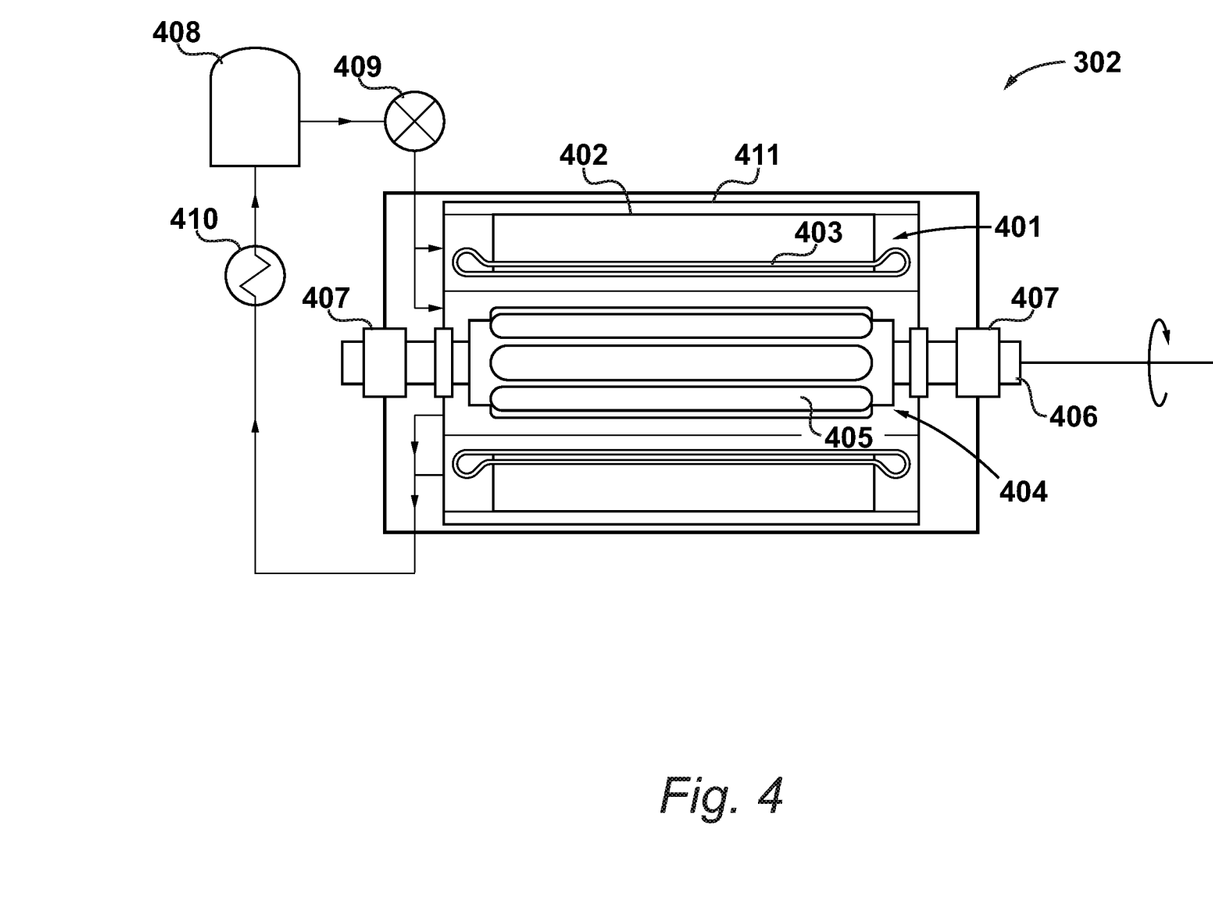
FIG. 4 is a diagram of an electric machine that may be used in the system of FIG. 3.

As set out previously, the electric machine 302 comprises a stator 401 having a fully non-magnetic core 402 (also known as "air-cored") and non-superconducting windings 403. The non-magnetic core 402 in the present embodiment comprises a resin in which the non-superconducting windings 403 are embedded. In a specific embodiment, the resin is a polymeric resin such as an epoxy resin, polyurethane resin, etc. Alternative non-magnetic core materials and/or support frames may be used to support the non-superconducting windings 403 to deal with the reaction torque during operation The non-superconducting windings 403 are formed from a transposed conductor. Transposed conductors are multi-strand conductors in which each strand is insulated, and is transposed in order to occupy each possible position along a specific length. The transposition of the strands may be continuous, discrete, or random. In this way, when the conductor is exposed to a magnetic field, each strand will on average link with the same number of flux lines as every other strand, thus dividing current equally among the strands. The strands are of small enough diameter that little skin effect can occur, thereby reducing losses due to induced eddy currents caused by the rotating rotor field.

In the present embodiment, the non-superconducting windings 403 in the stator 401 are formed from litz conductor. Litz conductors are a particular type of transposed conductor in which strands of round cross-section are transposed continuously along the cable length. Other transposed conductors may be contemplated, such as Roebel conductors which use rectangular strands transposed at discrete intervals.

In an embodiment, a strand diameter of less than 1 millimetre may be selected. For example, strand diameters of 0.3, 0.2, 0.1 and 0.08 millimetres may be used.

The transposed conductor may, in an embodiment, be formed of copper. In another embodiment, it may be formed of aluminium. Alternatively, any other non-superconducting conductor may be selected.

The electric machine 302 further comprises a rotor 404 which also has a fully non-magnetic core, along with superconducting windings 405. Alternatively, the rotor 404 may comprise superconducting magnets instead. In the present example the superconducting windings 405 are mounted to a shaft 406 that is supported by bearings 407.

A cryogenic cooling system is provided to maintain the superconducting windings 405 in a superconducting state. In the present example, the cryogenic cooling system comprises a cryogenic tank 408 for storing a cryogenic cooling fluid, along with a pump 409 for circulating the fluid, which, in the present embodiment, is liquid nitrogen. A cooler 410 is included in the return path to remove heat. Alternative fluids may be used, such as liquid helium etc, Such arrangements will be familiar to those skilled in the art.

In the present embodiment, the cryogenic cooling system is also used to cool the non-superconducting stator windings 403. In an alternative arrangement, two cryogenic cooling systems may be provided, for dedicated cooling of each of the stator 401 and the rotor 404.

In the present embodiment, the cryogenic cooling system is a high temperature cryogenic cooling system. It will be appreciated by those skilled in the art that the term "high temperature cryogenic" has, in terms of temperature, a generally-defined upper limit in the art of 223 kelvin. In an embodiment, the cryogenic cooling system is configured to maintain the non-superconducting windings 403 at a cryogenic temperature, i.e. at 223 kelvin or below.

It should be noted that one advantage of cooling the non-superconducting windings 403 with the same cryogenic cooling system as the superconducting windings 405 is that it reduces the temperature differential between it and the superconducting windings 405 in the rotor 404. This facilitates a reduction in air gap as less thermal insulation is required.

For example, in the present embodiment the airgap length between the rotor 404 and stator 401 comprises 10 millimetres of mechanical standoff plus 2 millimetres of thermal insulation to facilitate sufficient thermal isolation therebetween. This allows higher cryogenic operational temperatures in the stator compared to in the rotor. However, it is contemplated that bringing the operational temperature of the non-superconducting windings 403 closer to that of the superconducting windings 405 will facilitate reduction of this airgap to smaller lengths, for example, 5 millimetres. Thus the airgap length will be no longer dictated by the required thermal insulation, but instead by rotordynamic constraints which do not require such large airgap lengths.

In the specific embodiment of FIG. 4, the stator 401 further comprises a magnetic screen 411 to contain the high field generated by the superconducting windings 405. In an example, the magnetic screen may be a superconducting magnetic screen, with cooling thereof provided by the cryogenic cooling system.

In the present embodiment, the electric machine 302 is configured to have a power output of 1 megawatt at a speed of 12000 revolutions per minute. In the present example, it is an 8-pole machine, however a 16-pole configuration may be contemplated. Further, the current density in the stator windings 403 may be 8 amps per square millimetre, or may alternatively be 16 amps per square millimetre depending upon desired power output. It is also contemplated that the stator windings 403 will be supplied with alternating current at a frequency of 800 hertz.

It will be appreciated however that selection of pole number, current density, and frequency is very much dependent upon the intended application of the machine, particularly in terms of power output and supply characteristics, and thus different values of each parameter may be adopted.

As described previously, the electric machine 302 combines non-superconducting stator windings 403 formed of a transposed conductor in a non-magnetically cored stator 401, with cooling thereof by a cryogenic cooling system.

It will be appreciated that as temperature decreases, the magnitude of the eddy currents in a loop, and the losses associated therewith, increases due to the attendant rise in conductivity. Eddy currents are also proportional to the square of the conductor strand radius. Conduction loss is proportional to resistivity, but is dependent only upon total conductor volume, not strand radius. Its magnitude is therefore not affected by use of transposed conductor—only the temperature changes it.

Thus, as the temperature drops, there is a sharper drop in conduction loss than there is increase in eddy current loss. Eventually, the temperature will drop to the point of the residual resistivity of the windings and the conduction loss will be substantially constant with eddy current losses dominating. The inventors have identified that the use of a cryogenic cooling system arranged to cool the non-superconducting stator windings 403 places the machine 302 into an operating regime which provides a surprisingly effective balance between these loss mechanisms.

Figure 5:
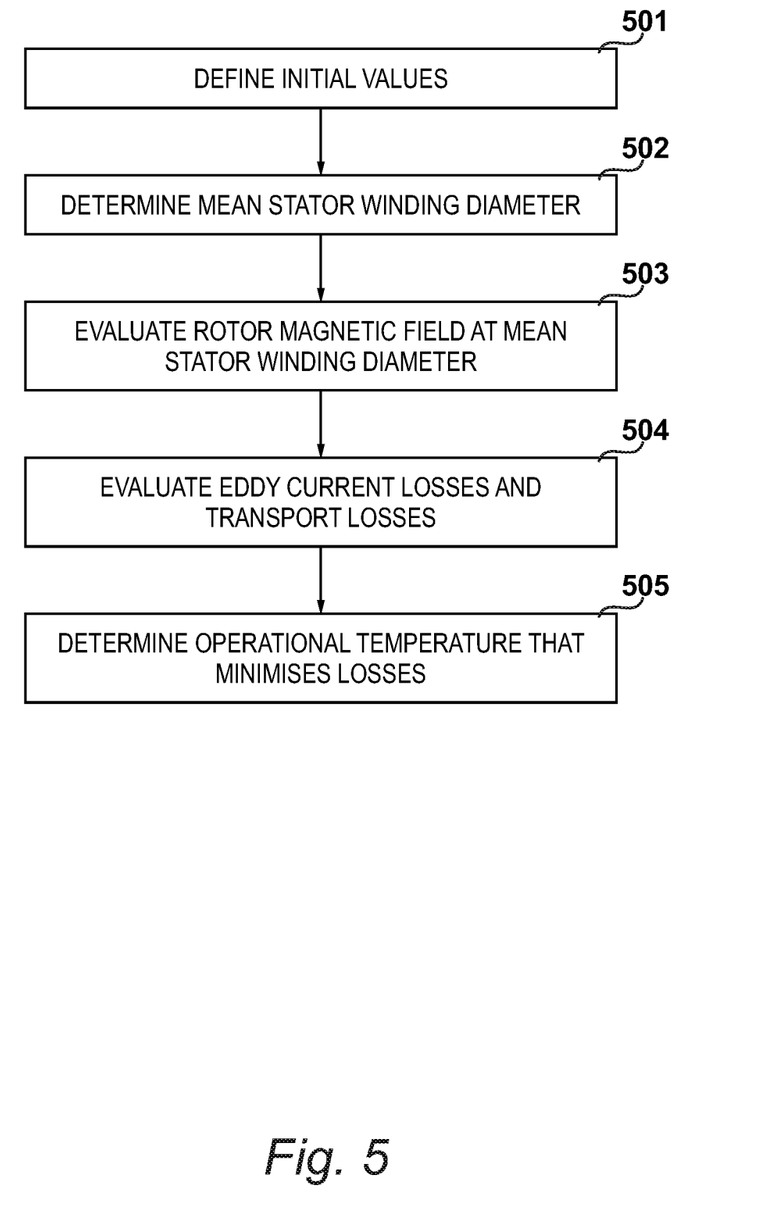
FIG. 5 sets out a method for establishing an operational temperature for the stator in the electric machine of FIG. 4.

Whilst it is contemplated that operation of the non-superconducting stator windings 403 at any cryogenic temperature as herein defined will result in this effect, a method of identifying the optimum cryogenic temperature for the stator windings 403 is set out in FIG. 5.

Conventional machine design equations typically relate the rotor torque to the rotor volume and the assumed electric and magnetic loadings. In the case of the electric machine 302, however, the non-magnetic core 402 means that the magnetic field produced by the superconducting windings 405 is not constant, but is instead a complex function of radial position.

Assuming, however, that there are no harmonic fields and the power factor of the electric machine 302 is close to unity, it is possible to instead relate the torque developed by the machine to the rotor volume and only the electric loading of the stator and the rotor.

Thus, at step 501, an initial set of parameters are set:
$\tau$: torque to be developed by the electric machine 302;
g: magnetic airgap length between the stator 401 and the rotor 404;
n: pole-pair number;
$J_s$: current density in the non-superconducting windings 403 of the stator 401;
$J_r$: current density in the superconducting windings 405 of the rotor 404;
$\alpha$: aspect ratio of the electric machine 302;
$h_s$: radial height of the non-superconducting windings 403 of the stator 401,
$h_r$: radial height of the superconducting windings 405 of the rotor 404.

At step 502, the mean diameter $D_s$ of the non-superconducting windings 403 in the stator 401 may be evaluated by using the following relation:

$$\tau = k_T J_s J_r f(D_s) \quad \text{[Equation 1]}$$

where:

$$k_T = \mu_0 \frac{\pi}{8} \alpha h_s h_r \quad \text{[Equation 2]}$$

and $$f(D_s) = D_s^3 \left(1 - \frac{h_s + h_r + 2g}{D_s}\right)^{n+1} \quad \text{[Equation 3]}$$

Equations 1, 2, and 3 stem from a two-dimensional analytical solution of the magnetic field distribution in free space for a current sheet placed at the mean diameter of the superconducting winding 405, $D_r$, which is related to $D_s$ by $h_r$, $h_s$, and g. This enables the magnetic field at $D_s$ to be expressed in terms of $D_r$, $J_r$, and n.

Equation 1 may be solved for $D_s$ using, for example, Newton's method.

Once $D_s$ has been evaluated, the magnetic field at that location may be evaluated at step 503.

At step 504, the eddy current losses, $P_{eddy}$, in one strand of the non-superconducting windings 403 may be expressed as:

$$P_{eddy} = \frac{1}{8} B^2 \omega^2 r_{strand}^2 \frac{1}{\rho(T)} \quad \text{[Equation 4]}$$

where B is the magnetic field strength, $\omega$ is the frequency which is dependent upon rotor speed and pole-pair number n, $r_{strand}$ is the radius of a strand in the transposed conductor, and $\rho(T)$ is the resistivity of the transposed conductor at a given absolute temperature T.

The conduction losses, $P_{conduction}$, in one strand of the non-superconducting windings 403 may be expressed as:

$$P_{conduction} = J_s^2 \rho(T) \quad \text{[Equation 5]}$$

Defined in this way, both $P_{eddy}$ and $P_{conduction}$ are in terms of watts per cubic metre.

An expression for the total losses $P_{tot}$ due to these mechanisms at a particular absolute temperature T may therefore be constructed:

$$P_{tot} = V(P_{eddy} + P_{conduction}) \quad \text{[Equation 6]}$$

where V is the total volume of the non-superconducting windings 403.

The optimum temperature to which to cool the non-superconducting windings 403 may therefore be determined at step 505 by differentiating Equation 6 with respect to $\rho$ to determine the value of $\rho$ that gives the lowest losses. This produces the following relation for $\rho$:

$$\rho = \frac{\omega B r_{strand}}{\sqrt{8} J_s} \quad \text{[Equation 7]}$$

Then, this value of $\rho$ may be converted into a temperature by use of established conductivity versus temperature data for the particular material selected for the non-superconducting windings 403.

It will of course be appreciated by those skilled in the art that other methods of establishing an optimal operational temperature may be valid and may be used in place of the method set out in FIG. 5.

Figure 6:
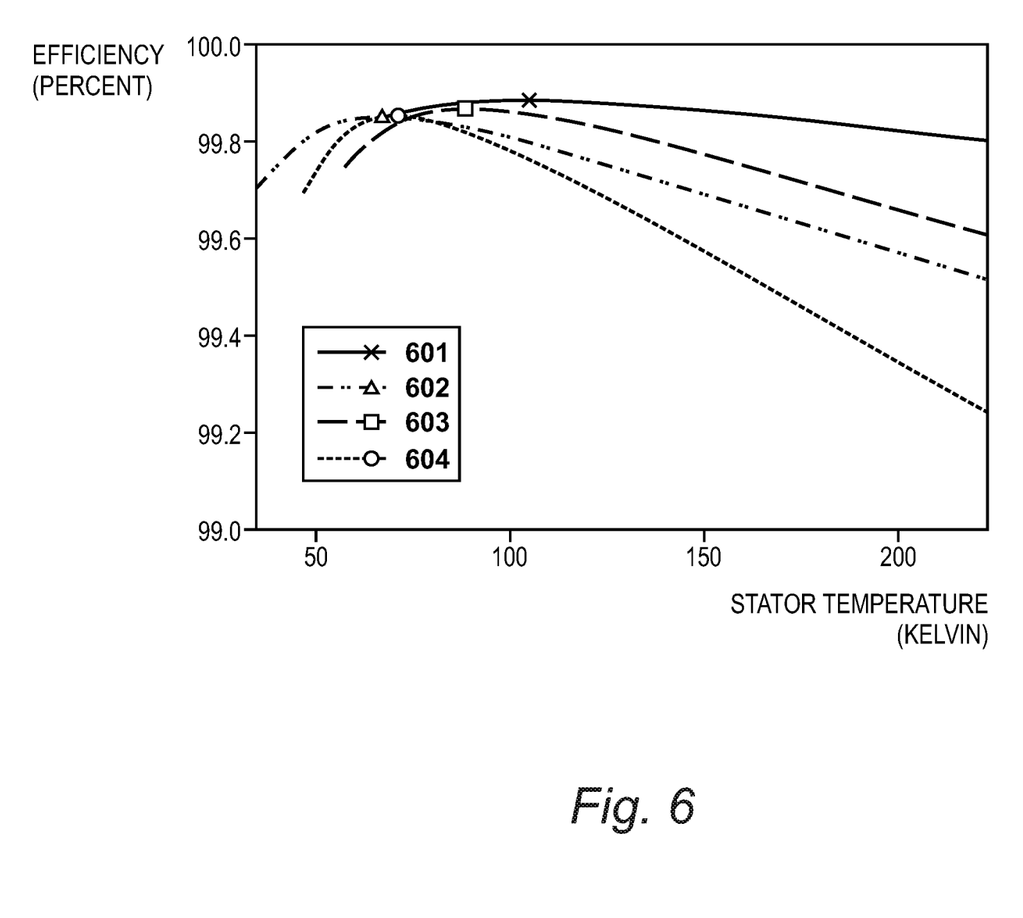
FIG. 6 shows a plot of efficiency versus stator temperature for four configurations of electric machine.

An exemplary plot of efficiency of the electric machine 302 against operational temperature of the non-superconducting windings 403 in the stator 401 is shown in FIG. 6. It can be seen that high efficiencies are obtained over a range of cryogenic temperatures.

Curve 601 was produced by the method of FIG. 5, for a machine with a 1 megawatt target power, a speed of 12000 revolutions per minute. 8 poles, copper litz windings 403 having a strand diameter of 0.1 millimetres, and a current density $J_s$ equal to 8 amps per square millimetre. Following determination of sizing of such a configured electric machine 302, an estimated power density of 20.1 kilowatts per kilogram was derived. The optimal operational temperature for the non-superconducting windings 403 was found to be 104.8 kelvin which gave an estimated efficiency of 99.87 percent.

Curve 602 was produced by the method of FIG. 5, for a machine with a 1 megawatt target power, a speed of 12000 revolutions per minute, 8 poles, copper litz windings 403 having a strand diameter of 0.1 millimetres, and a current density $J_s$ equal to 16 amps per square millimetre. Following determination of sizing of such a configured electric machine 302, an estimated power density of 29.4 kilowatts per kilogram was derived. The optimal operational temperature for the non-superconducting windings 403 was found to be 68.4 kelvin which gave an estimated efficiency of 99.85 percent.

Curve 603 was produced by the method of FIG. 5, for a machine with a 1 megawatt target power, a speed of 12000 revolutions per minute, 8 poles, aluminium litz windings 403 having a strand diameter of 0.1 millimetres, and a current density $J_s$ equal to 8 amps per square millimetre. Following determination of sizing of such a configured electric machine 302, an estimated power density of 26.3 kilowatts per kilogram was derived. The optimal operational temperature for the non-superconducting windings 403 was found to be 87.7 kelvin which gave an estimated efficiency of 99.86 percent.

Curve 604 was produced by the method of FIG. 5, for a machine with a 1 megawatt target power, a speed of 12000 revolutions per minute, 8 poles, aluminium litz windings 403 having a strand diameter of 0.1 millimetres, and a current density $J_s$ equal to 16 amps per square millimetre. Following determination of sizing of such a configured electric machine 302, an estimated power density of 36.6 kilowatts per kilogram was derived. The optimal operational temperature for the non-superconducting windings 403 was found to be 70.3 kelvin which gave an estimated efficiency of 99.85 percent.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. An electric machine comprising:
   a stator having a fully non-magnetic core and stator windings formed of a non-superconducting transposed conductor to reduce eddy current losses;
   a rotor having a fully non-magnetic core and superconducting windings or superconducting magnets which produce a magnetic field for interaction with the stator windings; and
   a cryogenic cooling system that is configured to cool both the non-superconducting transposed conductor of the stator windings and the superconducting windings or superconductor magnets of the rotor, to reduce conduction losses in the stator windings and to maintain the superconducting windings or superconducting magnets of the rotor in a superconducting state.

2. The electric machine of claim 1, in which the transposed conductor is a litz conductor.

3. The electric machine of claim 1, in which the stator windings are formed from wire strands having a diameter of less than 1 millimetre.

4. The electric machine of claim 1, in which the stator windings are formed from one of:
   copper;
   aluminium.

5. The electric machine of claim 1, in which the cryogenic cooling system is a high temperature cryogenic cooling system.

6. The electric machine of claim 5, in which the cryogenic cooling system is configured to, in operation, maintain the stator windings at a temperature of 223 kelvin or below.

7. The electric machine of claim 1, in which the fully non-magnetic core in the stator comprises a resin.

8. The electric machine of claim 1, comprising one of:
   8 poles;
   16 poles.

9. The electric machine of claim 1, in which the current density in the stator windings is, in operation, one of:
   8 amps per square millimetre;
   16 amps per square millimetre.

10. The electric machine of claim 1, in which, in operation, the stator windings are supplied with an alternating current at a frequency of 800 hertz.

11. A propulsion system for an aircraft, comprising:
    an electrical network for distributing electrical power;
    a source of electrical power connected with the electrical network; and
    one or more electric machines according to claim 1, connected with the electrical network for driving a fan to propel the aircraft.

12. The propulsion system of claim 11, in which at least one of the one or more electric machines drives a boundary layer ingestion fan.

13. A propulsion system for an aircraft, comprising:
    an electrical network for distributing electrical power;
    one or more electric machines according to claim 1 connected with the electrical network for generating said electrical power; and
    one or more electric propulsion units connected with the electrical network for propelling the aircraft.

14. The propulsion system of claim 13, in which the or each electric machine is driven by a respective internal combustion engine.

15. The propulsion system of claim 14, in which the or each internal combustion engine is one of:
    a piston engine;
    a turbomachine.

* * * * *